Figure 1:
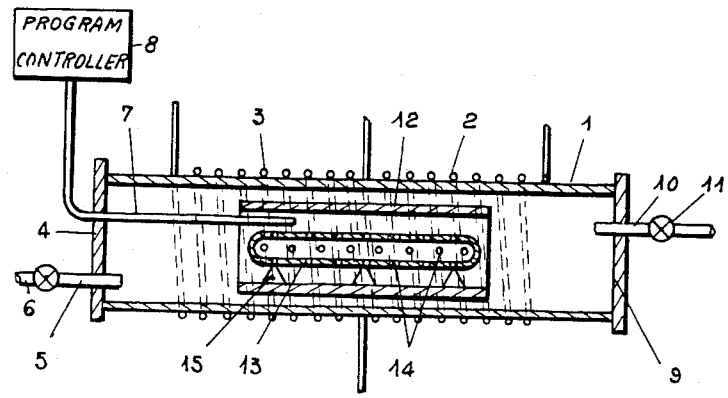

May 10, 1960    J. M. N. HANLET    2,936,252

PREPARATION OF LAYERS OF ELECTROLUMINESCENT MATERIALS
Filed Sept. 20, 1957

Inventor
Jacques M. N. Hanlet
By Ralph B. Stewart
Attorney

United States Patent Office 2,936,252
Patented May 10, 1960

---

2,936,252

PREPARATION OF LAYERS OF ELECTROLUMINESCENT MATERIALS

Jacques Marie Noel Hanlet, Paris, France, assignor to Societe d'Electronique et d'Automatisme, Courbevoie, Seine, France Application September 20, 1957, Serial No. 685,345

Claims priority, application France September 24, 1956

5 Claims. (Cl. 117—211)

This invention relates to preparation of layers of electroluminescent materials, and it comprises a process of making thin layers of electroluminescent materials, such as the sulfides and oxides of cadmium and zinc, wherein monocrystals of the desired electroluminescent material are first prepared by vaporizing the basic components thereof in an atmosphere of hydrogen sulfide or oxygen, depending upon whether a sulfide or oxide layer is desired, the vapors being deposited on a base in the form of monocrystals, these monocrystals being recovered and then vaporized in a high vacuum to be deposited upon a suitable base which is heated to a temperature causing the deposit to re-crystallize in the form of monocrystals; said support being advantageously provided with a vapor deposited oxide layer to which the monocrystals adhere with tenacity; all as more fully hereinafter set forth and as claimed.

While numerous processes have been described of producing electroluminescent layers, these prior processes leave considerable to be desired with respect to adherence of the layers to the bases and stability of the layers. I have discovered that these difficulties can be largely eliminated by the use of a two step process, in the first step of which monocrystals are formed of the electroluminescent material, which is the sulfide or oxide of cadmium or zinc, these monocrystals being produced by vaporization of the basic components of the cadmium or zinc compound in an atmosphere of hydrogen sulfide or oxygen, followed by deposition of the vapors upon a base under conditions forming monocrystals. In the second step the monocrystals formed in the first step are vaporized under a high vacuum and deposited upon a translucent base which has advantageously been previously provided with an adherent layer of an electrically conducting vapor-deposited oxide, said base being heated sufficiently to cause the deposited material immediately to re-crystallize in the form of monocrystals. The layer of monocrystals so formed is of extreme purity, which probably accounts for its superior stability, and it is firmly adherent to the base.

The invention will be described specifically as applied to the formation of layers of cadmium and zinc sulfides. But it must be understood that these are merely illustrative embodiments of my process which can be used to form electroluminescent layers of both sulfides and oxides of cadmium and zinc. Those skilled in the art will have no difficulties in applying the principles involved in my invention to the formation of these electroluminescent layers.

My invention can be described in greater detail by reference to the accompanying drawing which shows, more or less diagrammatically, suitable equipment which can be used in the preparation of my electroluminescent layers. In this showing—

Figure 2:
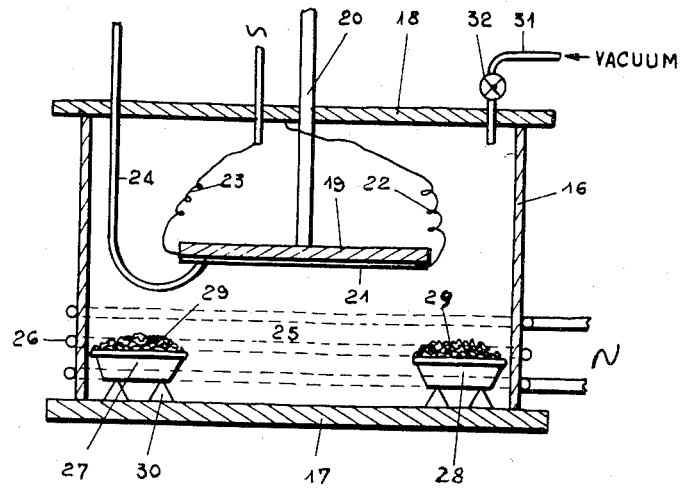

Fig. 1 is a vertical central section through an apparatus which can be used in the first step of my process in order to produce monocrystals of the electroluminescent material which is to form the final electroluminescent layer, while Fig. 2 is a similar section through an apparatus that can be used in the second step of my process to vaporize the monocrystals formed in the first step and to deposit the vapors on a translucent base which, advantageously, has been previously provided with a vapor-deposited conducting layer of a metal oxide.

In the apparatus of Fig. 1 reference numeral 1 denotes a long tube of silica or the like, which is provided with exterior heating coils 2 and 3. This tube can be heat-insulated if desired. The tube is closed at its entrance end with a plate 4 through which passes a tube 5, provided with valve 6, for introducing hydrogen sulfide or oxygen into the furnace tube 1. This end plate also supports a thermocouple 7 which measures the temperature inside the furnace and is connected to a program controller 8 which controls the temperature inside the furnace to a scheduled program. The exit end of the furnace tube is closed by another end plate 9 through which passes an outflow tube 10 controlled by valve 11. Inside the furnace tube 1 an inner tube 12 of silica or other heat-resistant material is supported. This inner tube fits the furnace tube rather closely but can be easily introduced into and removed therefrom. The monocrystals which are formed in the first step of my process are deposited on the inner surface of this inner tube 12. The vapors which, when deposited, produce the said monocrystals are generated in the central bulb 13, which can be constructed of a heat-resistant glass, such as a borosilicate glass for example. This bulb is perforated with small evenly-spaced holes 14 and is supported centrally within tube 12 by means of spacers 15. The bulb should be considerably smaller than the inner diameter of tube 12, in order to provide sufficient space for vapors discharged through holes 14 to become uniformly dispersed before they reach the inner wall of tube 12.

In conducting the first step of my process, making use of the apparatus of Fig. 1, I fill the bulb 13 with one or more basic materials whose sulfide or oxide is to form the electroluminescent layer. This basic material may be cadmium or zinc oxide or salts of these metals which decompose on heating, such as the sulfides or carbonates, for example. The bulb is then inserted into tube 13 and supported coaxially therein with the spacer elements 15. This assembly is then slid into the center of outer tube 1, the two ends of the latter are closed and heating coils 2 and 3 are energized. The temperature is raised slowly. The air present in the furnace tube is flushed out by opening valves 6 and 11 and passing hydrogen sulfide or oxygen therethrough. Heating is then commenced. Thereafter until towards the end of the heating period a slow flow of one of these conditioning gases can be maintained through the furnace tube. The program controller raises the temperature during the heating-up period at a rate of from about 400° to 600° C. per hour and the time interval of this temperature rise should be about 1 to 2 hours, at the end of which time the temperature should reach a point slightly above the vaporization point of the basic material. The program controller then holds the temperature relatively constant with temperature fluctuations not substantially exceeding plus or minus 10° C. over a holding period which should continue for from about 45 to 90 minutes, sufficient to vaporize substantially all of the basic material present in bulb 13. During this time monocrystals of the sulfide or oxide of the metal component of the basic material are deposited on the inner surface of tube 12. The temperature holding step is followed by a cooling step. During this step the temperature can be lowered at a rate of from about 150° to 250° C. per hour until a temperature of about 100° C. is reached. At this point the tube 12 can be removed from the furnace tube and the monocrystals deposited on its inner surface recovered. These crystals are then used in the second step of my process, using the apparatus shown in Fig. 2 of the drawing.

It should be noted that the supply of conditioning gas which is passed through the furnace tube need not be started until the melting point of the basic material is about to be reached, although it is advantageous to supply a small flow of conditioning gas even during the initial stages of the heating-up step. Just before the vaporizing point of the basic material is reached it is essential that the flow of conditioning gas be started and this must be continued through the holding period. Suitable rates for the flow of this gas are from about 0.15 to 0.5 liter per minute from the start of the heating period up to a temperature of about 200° C. The rate of flow should then be increased to within the range of from about 1.5 to 2.5 liters per minute until the melting point of the basic substance is reached, at which point the flow should be still further increased to within the range of from about 3 to 5 liters per minute until the completion of the holding period and for about 20 to 30 minutes of the cooling period. Shortly before the temperature has again reached about 300° C. the flow of gas can be reduced to from about 0.5 to 1.5 liters per minute and as the temperature is lowered from about 300° C. to the completion of the cooling period the flow of gas can be reduced to from about 0.1 to 0.3 liter per hour. The rate of flow of the conditioning gas can be controlled by turning either or both of valves 6 and 11. If the supply of gas is only slightly above atmospheric pressure suitable control can be obtained by turning valve 11 alone, otherwise both valves can be used. The pressure inside the furnace tube should be slightly above atmospheric pressure to prevent the inflow of extraneous gases. The hydrogen sulfide or oxygen which is passed through the oven must be of high purity and thoroughly dry.

In Fig. 2 an apparatus is shown which can be used in the second step of my process. In this second step the monocrystals of the electroluminescent sulfide or oxide, formed in the first step of my process, are deposited from the vapor state on a base. As indicated previously this base is preferably supplied with a layer of a vapor-deposited metal oxide which is an electrically conducting film. This has a double advantage in that the base can be heated by the passage through the semi-conducting layer of an electric current and second that the adherence of the final electroluminescent layer to the oxide layer is extremely tenacious. A preferred method of producing this vapor-deposited oxide layer is described in my copending application, Serial No. 636,410, filed January 25, 1957.

In this method a homogeneous mixture of at least two halogenides (the chlorides, for example) of the elements of the groups III to V of the periodic table is vaporized in an oxidizing atmosphere, such as moist air, for example, and deposited on a translucent base of dielectric material, which may be of silica or a heat-resistant glass, for example, the base being heated to produce decomposition of the halide with the consequent deposition on the base of a complex of oxides which is electrically conducting. The thickness of the oxide film produced is usually of the order of 1 micron although thicker films can be produced, of course. The film is almost transparent. It is hard and resistant to mechanical action.

The apparatus of Fig. 2 of the drawing is composed of a vessel 16 which may be a short cylinder of a heat-resistant glass, for example. This is closed at the bottom by a plate 17. Top plate 18 provides a support for the base 19 which can be held substantially centrally by means of rod 20. The lower surface of the base 19 is provided with a layer of electrically-conducting oxide 21, produced as described above. This oxide layer is heated electrically by means of the electrical connections 22 and 23. A thermocouple 24 is supported from the top plate 18 to measure the temperature of the layer 2. The vaporization zone is indicated generally at 25. This zone is heated by the coils of a high-frequency induction heater 26 which during its operation serves to vaporize the monocrystals produced in the first step of my process. These monocrystals 29 are held in boats 27 and 28 which are equally and symmetrically spaced from the base on which the deposit is produced, i.e. the boats are positioned isotopically with respect to this base. They can be supported above the base plate and in the center of the heating zone by means of supports 30. The interior of the heating chamber is evacuated by means of the tube 31 which is attached to a vacuum pump capable of producing a vacuum of the order of about $10^{-4}$ millimeters of mercury. A valve 32 controls the vacuum line.

*Example 1.*—An electroluminescent coating of cadmium sulfide is prepared by placing a charge of 50 grams of metallic cadmium in the bulb 13 shown in Fig. 1 of the drawing, inserting this bulb midway into tube 12 and sliding this assembly into the midportion of the furnace tube 1. The end plates are attached and the program controller started to regulate the temperature of the process. The rate of temperature rise during the heating up step is about 500° C. and the duration of this step is about 90 minutes for a cadmium load of 50 grams. When the temperature reaches 750° C. the holding temperature, it is held at this point for about 1 hour, the temperature fluctuations not exceeding plus or minus 10° C. The length of this holding period largely determines the size of the monocrystals produced on the inner surface of tube 12. It can be made longer if relatively larger crystals are desired. After the holding period the cooling off commences with the temperature dropping at a rate of about 200° C. per hour until a temperature of about 100° C. is reached. The collecting tube 12 is then removed from the oven tube for further cooling and the crystals are recovered therefrom. During the heating hydrogen sulfide is passed through the oven tube, starting during the heating up stage when the temperature reaches about 200° C. at a rate of about 0.2 liter per minute, increasing to 2 liters per minute when the temperature reaches 320° C. and still further increasing to a value of about 3.2 liters per minute during the temperature holding stage. This high rate of flow of hydrogen sulfide is continued for about 20 minutes after the cooling period is started after which the flow is reduced to about 1 liter per minute. When the temperature reaches about 300° C. the flow is reduced still further to about 0.2 liter per minute until the end of the process.

The step described above produces monocrystals of cadmium sulfide in the form of thin slabs of the order of 100 microns in thickness, from 1–2 mm. in width and from 15 to 20 mm. in length. Crystals of this type are usually known as "greenekite." Their resistance in the dark averages about 1000 megohms in the direction of their surface and $10^6$ megohms in a direction perpendicular to their surface.

In the second step the crystals recovered in the first step are loaded into boats, such as 27 and 28 of Fig. 2. These boats which may be greater in number than the two shown, are placed on bottom of plate 17 symmetrically about the base 19. The valve 32 to the vacuum line 31 is opened and the high frequency heater is energized. Before the vaporization temperature of the cadmium sulfide crystals is reached, the heating current attached to the oxide layer 21 of base 19 is turned on. The temperature of this oxide layer must not be lower than 350° C. during the vaporization of the cadmium sulfide monocrystals. This temperature must be sufficiently high to produce the recrystallization of the cadmium sulfide as it is deposited on the heated oxide layer. The operative temperature range is from about 350° to 400° C.

The layer of cadmium sulfide obtained in the described manner has valuable electroluminescent and electrophotoluminescent properties. The photoconduction obtained is substantially linear, that is to say without any substantial rectifying effect. The layer has an internal resistance higher than 100,000 megohms in the dark for an applied potential of 10,000 volts/cm.$^2$/cm.

*Example 2.*—An electroluminescent layer of zinc sulfide can be produced by a procedure which is very similar to that used in Example 1. A charge of 50 grams of metallic zinc is placed in bulb 13. In this case the temperature rise during the heating up period of the first step is about 600° C. per hour. This heating up period lasts about 1 hour. The holding period also lasts 1 hour and the temperature during this interval is maintained at 900° C. plus or minus 10° C. During cooling the temperature drops at a rate of 200° C. per hour. The rate of admission of hydrogen sulfide during the process is about the same as in Example 1, although in the case of zinc sulfide it is not essential to start the flow of hydrogen sulfide until a temperature of about 420° C. is reached. However in this specific example a flow rate of about 0.2 liter per hour is started when the temperature reaches 200° C., this rate increasing to 2–3.2 liters while the temperatures are above about 420° C., the flow then tapering off during the cooling off period.

The monocrystals of zinc sulfide recovered from the first step, with a holding temperature of 900° C., are of the type known as "sphalerite." But if a holding temperature of about 1100° C. is used, the resulting crystals are of the type known as "wurtzite." The sphalerite crystals are cubical, measuring about 5 mm. along their sides. Their resistivity is about 3000 megohms in the dark.

In the second step the monocrystals produced in the first step are heated in boats, as in Example 1, vaporized under vacuum conditions and deposited on the oxide layer 21. In this example the temperature of the oxide layer is maintained within the range of from about 780 to 820° C. while the zinc sulfide is being deposited thereon, this being required to produce recrystallization of the zinc sulfide during its deposition, from and to the sphalerite form thereof.

In general it may be said that the temperature of the base during the final step in which the electroluminescent layer is deposited on the base should be above the melting point of the compound which is being deposited but somewhat below the vaporization temperature thereof.

While I have described what I consider to be the most important embodiments of my process, it is evident, of course, that many variations can be made in the specific procedures which have been described without departing from the purview of this invention. Thus while the description has been confined to the production of electroluminescent layers of cadmium and zinc sulfides, layers composed of oxides of these metals can be produced by following the same general principles. As Example 3, I may consider the production of a layer of cadmium oxide, all conditions remaining alike but replacing the stream of H$_2$S of Example 1 by a stream of O$_2$ in the same conditions of temperature and supply. As Example 4, I may consider the production of a layer of zinc oxide, all conditions remaining alike but replacing the stream of H$_2$S of Example 2 by a stream of O$_2$ also in the same conditions of temperature and supply. Consequently, such oxide layers are formed by producing monocrystals of the desired oxide during a first step wherein a basic material containing cadmium or zinc is volatilized in an atmosphere of oxygen and deposited on a base, in substantially pure form, recovering the monocrystals from this first step, volatilizing them under vacuum conditions and depositing them from the vapor state on a base which is heated to a point above the melting point of the oxide but below its volatilization temperature, whereby the oxide recrystallizes as it is deposited forming an electroluminescent layer which is adherent to the base. The base is preferably transparent or at least translucent and it is advantageously pre-coated with an electrically conducting oxide layer which has been deposited from the vapors of at least two halides of the elements in groups II to V of the periodic table, one of the elements being preferably selected from group IV and another from group III or group V.

To make an electroluminescent device, the conducting oxide layer can serve as one electrode while a second electrode is placed against the outside of my sulfide or oxide coating. Since the oxide layer on which the latter is deposited is very thin and translucent and since the base is of translucent or transparent material, this is the side which is usually exposed to light fluctuations which are to be measured. It is also possible, of course, to employ a transparent electrode of conducting material which is placed on top of the sulfide or oxide layer and to expose this side of the device to light fluctuations. As indicated previously the electroluminescent layer produced as described is extremely stable, which I attribute to its high purity. The material from which this layer is made is purified twice, first by volatilizing and depositing it in the form of monocrystals, which are highly pure, and second by a second volatilization under conditions of vacuum.

It is possible, within the scope of the invention, to produce mixed electroluminescent layers containing mixtures of the sulfides or oxides of cadmium or zinc or mixtures of the sulfides and the oxides of these metals, and/or further containing traces of such activators as are silver, gold or copper in metallic or oxide form. These can be produced by placing a mixture of monocrystals of the desired composition in the boats employed in the second step of my process and heating sufficiently to volatilize all the monocrystals in the mixture. Other modifications of my process, which fall within the scope of the following claims will be immediately evident to those skilled in the art.

What I claim is:

1. In a process of making an electroluminescent layer, the steps which comprise providing a coating material consisting of monocrystals of a substantially pure binary compound selected from the group consisting of oxides and sulfides of cadmium and zinc, providing a translucent base positioned in a zone maintained under high vacuum, vaporizing said monocrystals in said zone, contacting said vapors with said base, heating said base to a temperature between the melting point and the volatilization temperature of said binary compound, whereby the coating material as it is deposited upon the heated base is recrystallized as substantially pure binary compound in the form of an electroluminescent layer.

2. A method as claimed in claim 1 wherein said electroluminescent layer possesses a photoconduction which is substantially linear.

3. An electroluminescent device comprising a translucent electrode, a second electrode and therebetween and in electrical contact with said electrodes, an electroluminescent layer as prepared by the process of claim 1.

4. The process of claim 1 wherein said monocrystals are volatilized in a vacuum of about $10^{-4}$ mm. of mercury, the monocrystals being symmetrically positioned with respect to the base on which their vapors are deposited.

5. The process of claim 1 wherein said base is provided on one face thereof with a thin electrically-conducting layer previously deposited thereon from the vapors of at least two halides of elements selected from groups II to V of the periodic table, and wherein the heating of said base is by the passage of an electric current through said layer.

References Cited in the file of this patent

UNITED STATES PATENTS

| | | |
|---|---|---|
| 2,140,668 | Depew | Dec. 20, 1938 |
| 2,675,331 | Cusano et al. | Apr. 13, 1954 |
| 2,710,813 | Forgue | June 14, 1955 |
| 2,732,312 | Young | Jan. 24, 1956 |
| 2,732,313 | Cusano et al. | Jan. 24, 1956 |